UNITED STATES PATENT OFFICE.

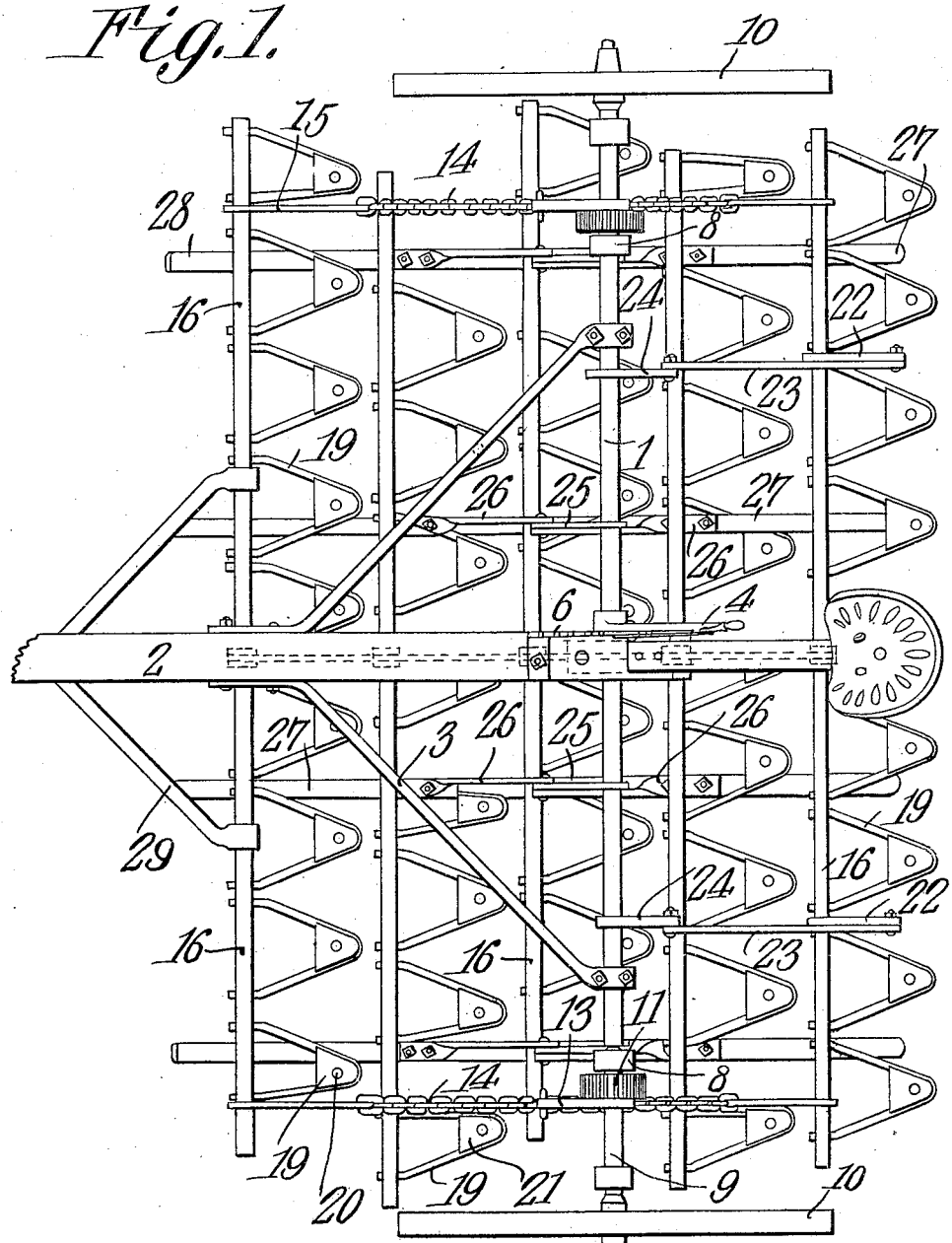

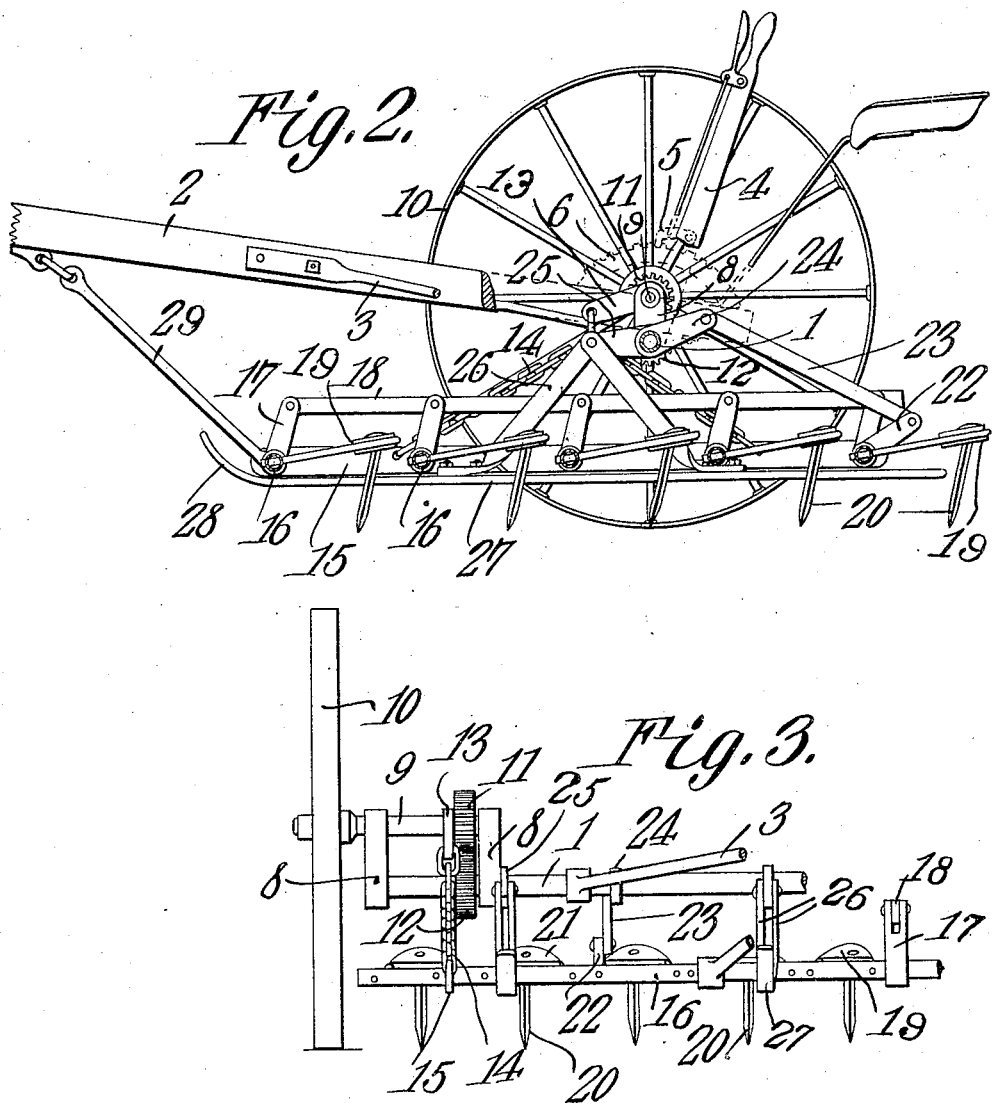

FRANK HOSFORD, OF STERRETT, TEXAS.

HARROW.

No. 877,647.

Specification of Letters Patent.

Patented Jan. 28, 1908.

Application filed February 26, 1907. Serial No. 359,351.

*To all whom it may concern:*

Be it known that I, FRANK HOSFORD, a citizen of the United States, residing at Sterrett, in the county of Ellis and State of Texas, have invented a new and useful Harrow, of which the following is a specification.

This invention relates to harrows of that character designed for collecting stalks after the same have been cut.

The object of the invention is to provide a riding harrow the teeth of which can be simultaneously swung upward out of engagement with the stalks.

A still further object is to provide means for holding the stalks upon the ground while the teeth are being withdrawn therefrom.

A still further object is to provide means whereby the harrow frame can be bodily raised out of operative position.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a plan view of the harrow; Fig. 2 is a longitudinal section therethrough; and Fig. 3 is a front elevation of one side portion of the harrow.

Referring to the figures by characters of reference, 1 is a rock shaft extending transversely of the machine and loosely connected to this rock shaft is a tongue 2 having diagonal braces 3 which are also mounted on the shaft 1 and loosely embrace it. This shaft has a lever 4 secured to it and provided with a plunger 5 designed to engage a toothed sector 6 which is secured upon the tongue. The driver's seat 7 is also supported by the tongue. The end portions of the shaft 1 are journaled within hangers 8 supported by rotatable axles 9 which are carried by the supporting wheels 10. A gear 11 is secured to each axle 9 and meshes with a gear 12 secured to the shaft 1, and an arm 13 extends from each axle 9 and has chains 14 connected thereto. These chains extend forwardly and rearwardly and are secured to the side rails 15 of the harrow frame. Said side rails are connected by parallel cross bars 16, each of which has an arm 17 extending upward from the central portion thereof, all of said arms being pivotally connected by a coupling bar 18. The bars 16 are mounted to rotate within the side strips 15 and it is apparent that in view of the connections 17 and 18 all these bars will rock in unison.

Extending from each of the bars 16 are rearwardly projecting arms 19, each of which is preferably V-shaped and has a tooth 20 secured to it in any desired manner. In the drawings each arm, which is made of a heavy rod bent into proper shape, has a casting 21 suitably secured in the apex of the arm and serves as a means for fastening the tooth 20 thereto. These teeth are disposed at desired intervals apart and as they are carried in rear of the bars 16 it is apparent that when the arms are rocked in one direction all the teeth will be swung upward away from any material which may be engaged thereby.

In order that the arms 16 may be manually actuated whenever it is desired one or more arms 22 are secured to one of the bars 16 and each of these arms is connected by means of a rod 23 to an arm 24 secured to the shaft 1. These arms 24 preferably extend rearwardly from the shaft 1 and another series of arms 25 extends forward from the shaft 1. Each of these arms 25 has diverging hangers 26 pivotally connected to it and the lower ends of each pair of hangers are fixed to a runner 27 which extends between certain of the teeth of the harrow and below the harrow frame, and has its forward end upturned, as shown at 28. The front end of the harrow frame is preferably connected to the tongue by means of links 29 or in any other desired manner so that a forward pull may be imparted to the harrow frame when the tongue 2 is pulled forward.

It is obvious that when the shaft 1 is rocked by pulling backward on the lever 4 the arms 24 press rearwardly on rods 23 and arms 22 and force the teeth 20 downward into operative position. The arms 25 at the same time lift the runners 27 above the ground so that material is free to accumulate thereunder. The gears 12 will also rotate the gears 11 so as to swing the arms 13 forward and downward and thereby permit the harrow frame to be supported solely by the teeth 20. When the machine is drawn forward these teeth will collect stalks, etc., in the path thereof and when it is desired to disengage them the lever 4 is pushed forward so as to cause the arms 25 to move downward and the arms 24 to move upward. As a result the runners 27 will be pressed downward on to the accummulated material, whereas the teeth 20 will be quickly withdrawn from engagement with said material. At the same time the frame of the harrow will be raised by the arms 15 which will be caused to pull upward on the chains 14. It will be seen that by means of this mechanism the harrow can be raised or lowered and material which has been accummulated thereunder is prevented from clinging to the teeth when the same are raised. The working parts of the harrow can of course be supported in raised position by locking the lever 4 after it has been shifted.

Instead of or in addition to the gearing which is employed for raising harrow a suitable arrangement of treadle operated levers may be employed whereby the driver by pressing downward on the treadle may lift the harrow. Where this means is employed in addition to the gearing which has been described the lifting of the harrow is rendered easier than where a single lifting means is employed.

What I claim is:

1. In a riding harrow the combination with a rock shaft, supporting wheels mounted thereon and means for actuating the shaft; of a harrow frame, runners disposed thereunder, and means operated by the movement of the shaft for shifting the runners vertically.

2. The combination with a rock shaft and wheels carrying the shaft; of a harrow frame, teeth movably connected to the frame, and means operated by the rocking of the shaft in one direction for simultaneously swinging the teeth and raising the frame toward the shaft.

3. The combination with a rock shaft, and means for actuating said shaft; of a harrow frame supported below the shaft, runners extending thereunder, and means operated by the movement of the shaft for simultaneously moving the frame and runners in opposite directions toward or from the shaft.

4. The combination with a rock shaft, and supporting wheels carrying said shaft; of a harrow frame supported below the shaft, teeth movably connected to and disposed to swing below the frame, and means operated by the rocking of the shaft in one direction for simultaneously lifting the frame toward the shaft and swinging the teeth.

5. The combination with supporting wheels, and a rock shaft journaled therein; of a frame supported below the shaft, runners extending longitudinally under the frame, teeth movably connected to the frame and extending between the runners, and means operated by the shaft for simultaneously swinging the teeth and moving the frame and runners in opposite directions toward or from the shaft.

6. The combination with supporting wheels and a shaft journaled therein; of a harrow frame supported below the shaft, a rock bar carried by the frame, rearwardly extending arms upon the rock bar, teeth extending from the arms, and means operated by the shaft for actuating the rock bar to swing the teeth to raise or lower them.

7. The combination with supporting wheels, axles rotatably mounted within the wheels, and a rock shaft suspended from the axles; of a harrow frame, lifting devices connecting the axles with the frame, means for rocking the shaft, and means for transmitting motion from the shaft to the axles to actuate the lifting devices.

8. The combination with a wheel supported rock shaft, and arms extending therefrom; of a harrow frame having rock bars therein, means for causing simultaneous movement of the rock bars, teeth connected to and movable with the bars, arms extending from one of the bars, and pivotal connections between said arms and the arms of the rock shaft.

9. The combination with a wheel supported rock shaft, means for actuating the same, and arms extending from the shaft; of a harrow frame supported below the shaft, runners extending longitudinally thereunder, and hangers secured to the runners and suspended from the arms.

In testimony that I claim the foregoing as my own, I have hereto affixed my signature in the presence of two witnesses.

FRANK HOSFORD.

Witnesses:
 W. A. CULBERTSON,
 L. C. EDMONDS.